E. F. BACKER.
GEARED LOCOMOTIVE.
APPLICATION FILED JULY 12, 1920.
1,397,716.
Patented Nov. 22, 1921.
2 SHEETS—SHEET 1.
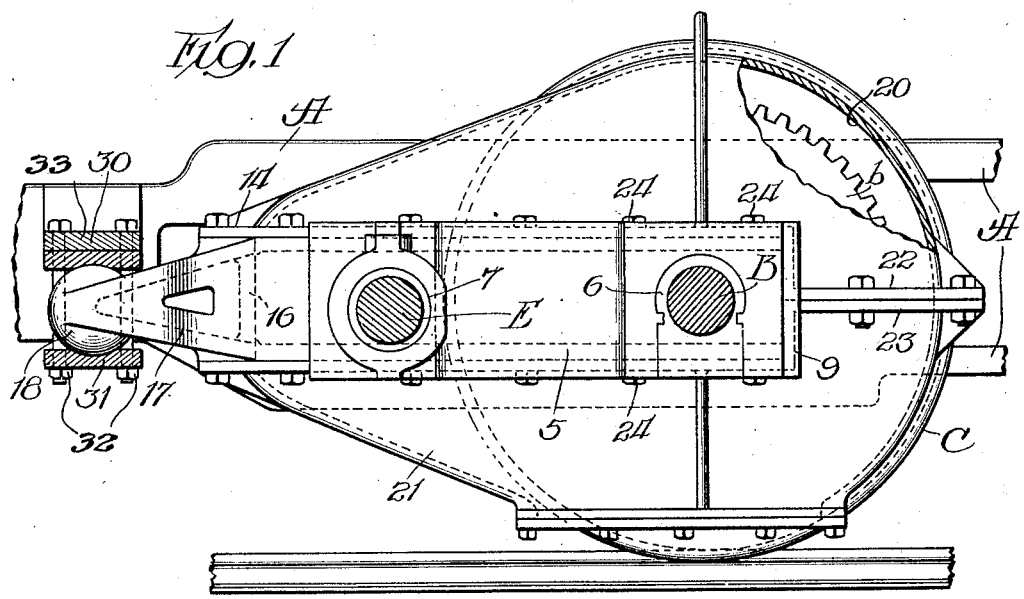
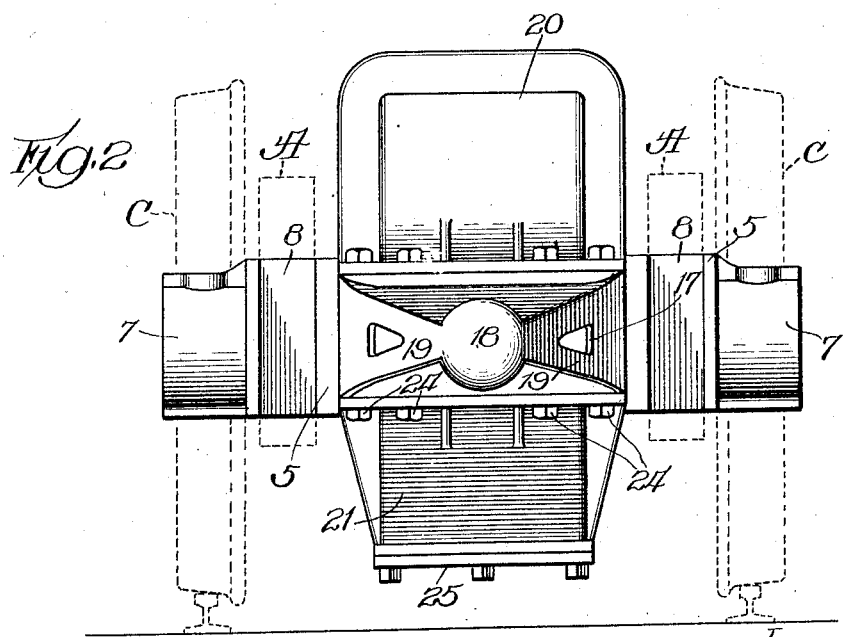
Inventor
Elmer F. Backer
By Frank D. Thomason
Atty E. F. BACKER.
GEARED LOCOMOTIVE.
APPLICATION FILED JULY 12, 1920.
1,397,716.
Patented Nov. 22, 1921.
2 SHEETS—SHEET 2.
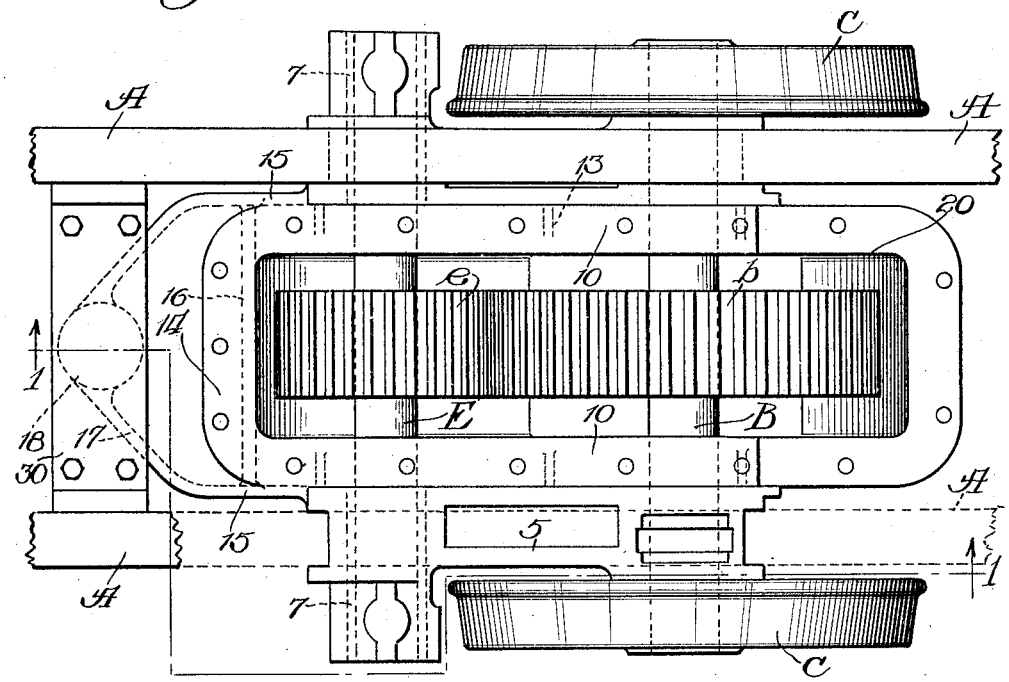
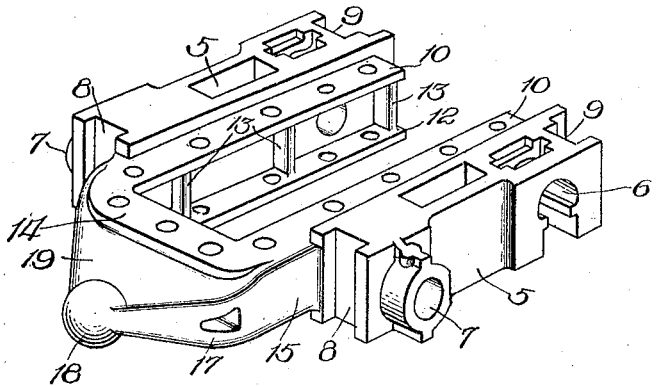
Inventor
Elmer F. Backer,
By Frank D. Thomason, Atty.

UNITED STATES PATENT OFFICE.

ELMER F. BACKER, OF DAVENPORT, IOWA, ASSIGNOR TO DAVENPORT LOCOMOTIVE WORKS, OF DAVENPORT, IOWA, A CORPORATION OF IOWA.

GEARED LOCOMOTIVE.

1,397,716.  Specification of Letters Patent.  Patented Nov. 22, 1921.

Application filed July 12, 1920. Serial No. 395,469.

*To all whom it may concern:*

Be it known that I, ELMER F. BACKER, a citizen of the United States, residing at Davenport, in the county of Scott and State of Iowa, have invented certain new and useful Improvements in Geared Locomotives, of which the following is a full, clear, and exact description.

My invention relates to geared locomotives and engines, and particularly to means for supporting the crank-shaft thereof in parallel relation to the drive-axle of the same.

The object of my invention is to provide such a support or suspension that the crank-shaft will rise or fall, or incline toward one end or the other synchronously with the axle of the drive-wheels, and thus keep the gears that connect said crank-shaft and axle in perfect mesh. A further object of my invention is to so construct the said supporting means that the same will be strong and durable and withstand and reduce to a minimum the loosening of the bolts used in securing the assembled parts together, due to rough usage to which it is subjected.

A further object of my invention is to provide means for giving a universal movement to a triangular frame, and to provide therefor a three-point support, two points being on the axle and one on the end of the frame, such frame having a drive shaft provided with a toothed gear that meshes with a pinion on a shaft that is parallel therewith.

My invention is hereinafter fully described, reference being had to the accompanying drawings, in which:

Figure 1 is a longitudinal vertical section of a portion of the supporting-frame of a geared locomotive and driving mechanism thereof to which my improvements are applied, taken on dotted line 2, 2, Fig. 3.

Fig. 2 is a rear view of the gear housing of said improvements.

Fig. 3 is a plan view of what is shown in Fig. 1, with the upper section of the gear-housing removed and with one side-frame shown in dotted lines.

Fig. 4 is a perspective view of the three point suspension frame of my improvements.

Referring to the drawings, A, A, represent the side-frames of a geared locomotive and B the axle of the drive-wheel C, C. The journals of this axle extend into and have bearings in the parallel portions 5, 5, of a U-shaped suspension-frame. These bearings are constructed in every material respect like the bearings mounted in the pedestals of the ordinary bearings now in common and extensive use, with the exception that the box or casting constituting the parallel portions 5, in which said bearings are mounted, is extended longitudinally and horizontally toward and past the crank-shaft E; from which latter the axle derives motion through the medium of a pinion $e$ mounted on the crank-shaft and a gear $b$ mounted on the axle midway between the side-frames. The parallel portions 5, 5, of the suspension-frame are also provided with bearings 7, 7, for the crank-shaft E, whose ends project beyond the same and are provided with suitable cranks (not shown) through the medium of which it is rotated. The parallel portions 5 are provided at each end, with column-guides 8 and 9, respectively, and these column-guides loosely engage the elements (not shown) that are used in conjunction with the vertical columns of the pedestals in the side-frames.

The inner surfaces of these parallel portions 5, 5, are provided with spaced apart horizontal flanges 10, and 12, and I prefer to connect these horizontal flanges by vertical struts 13. The said parallel portions 5, 5, are cored out between the bearings of the axle and the crank-shaft, and the part that corresponds to the inner walls 15 thereof are extended beyond the crank-shaft bearings of said parallel portions a given distance and the said extended wall 15, are connected by a transverse end-wall 16, shown in dotted lines in Figs. 1 and 3, which constitutes the transverse connecting member of the U-shaped supporting-frame. The flanges 10 and 12 also extend forward beyond the transverse plane of the crank-shaft bearings and then extend transversely and merge into each other to provide a support, which is integral with the end-wall 16, for the flanges of the forward ends of the upper and lower sections of the gear-housing, which will hereinafter be more fully explained. The walls 15, 15, are provided with forward extensions 17, 17, which converge toward the center of the width of the under-frame, and taper as they approach each other and merge into a spherical bearing member 18. The upper edges of these extensions 17, 17, are connected by a transverse incline web 19 which strengthens said extension and also sheds any dirt or other foreign matter that may fall thereon. The spherical bearing member 18, is journaled between transverse bearing-plates 30 and 31, which are secured by means of bolts and nuts 32 to the transom 33 connecting the side-frames A, A.

The pinion $e$ and the gear $b$ are inclosed by a housing consisting of an upper and lower section that are constructed substantially alike. This housing is, preferably, of the same width throughout its length, but the vertical dimensions of the portions inclosing the gear $b$ is much greater than that of the portion inclosing the pinion $e$. The upper section 20 has its lower edges and the lower section has its upper edges cut away to accommodate between them the flanges 10 and 12 of the parallel portions 5 of the U-shaped supporting-frame, and the opposing edges of these sections 20 and 21 are provided with lateral flanges 22 and 23, respectively, which latter extend clear around the sections. At the rear of the cut away portion of these sections, or, at the rear of the bearings 6 of the supporting-frame, these flanges 22 and 23 are bolted directly together, but the flanges of the cut away portions of said sections overlap the flanges 10 and 12 of the supporting-frame and are bolted thereto by bolts 24 that extend vertically through the flanges of both the upper and lower sections and their flanges 10 and 12, substantially as shown in the drawings. These bolts and nuts 24 are placed at suitable intervals apart clear around the housing from one bearing of the axle to the other. For the purposes of draining and cleaning the housing whenever necessary, I have provided the lower section 21 with a suitable opening in its bottom, which is closed by a suitable plate or cover 25. This cover is bolted or otherwise secured to the said section 21.

Connecting the housing to the supporting-frame of the crank-shaft in the manner hereinbefore described, provides a strong and durable support for said shaft and prevents wearing of the parts of said housing and said supporting-frame independently of each other, and thus avoids independent vibration and the consequent loosening of the bolts and deterioration of the structure due to these causes, which, heretofore it was necessary to contend with.

What I claim as new is:

1. A geared locomotive comprising side-frames, drive-wheels, the axle thereof, a crank-shaft, and gearing connecting the same to said axle, of an integral supporting-frame the parallel portions of which are movable vertically relative to the said side-frames and have bearings for said axle and shaft, a journaling device for said supporting-frame intersected by the medial line between said side frames on the side of the crank-shaft opposite said axle, bearings for said device, and a housing for said gearing associated with said supporting-frame.

2. A geared locomotive comprising side-frames, drive-wheels, the axle thereof, a crank-shaft, and gearing connecting the same to said axle, of an integral supporting-frame the parallel portions of which have inwardly projecting members movable in said side-frames and have bearings for said axle and shaft, a single journaling universal bearing for said supporting-frame intersected by the medial line between said side frames on the side of the crank-shaft opposite said axle, bearings for said device, and a housing for said gearing attached to said inwardly projecting members.

3. A geared locomotive comprising side-frames, drive-wheels, the axle thereof, a crank-shaft, and gearing connecting the same to said axle, of an integral supporting-frame the parallel portions of which have inwardly projecting horizontal flanges movable vertically in said side-frames and have bearings for said axle and shaft, a single journaling universal bearing for said supporting-frame intersected by the medial line between said side frames on the side of the crank-shaft opposite said axle, bearings for said device, and a housing for said gearing having laterally projecting flanges that are secured to the flanges of said supporting-frame.

4. A geared locomotive comprising side-frames, drive-wheels, the axle thereof, a crank-shaft, and gearing connecting the same to said axle, of an integral supporting-frame the parallel portions of which have inwardly projecting horizontal flanges movable vertically in said side-frames and have bearings for said axle and shaft, a single journaling universal bearing for said supporting-frame intersected by the medial line between said side frames on the side of the crank-shaft opposite said axle, bearings for said device, and a housing for said gearing comprising an upper and a lower and having laterally projecting flanges that are secured to the flanges of said supporting-frame.

5. A geared locomotive comprising side-frames, drive-wheels, the axle thereof, a crank-shaft, and gearing connecting the same to said axle, of an integral supporting-frame the parallel portions of which have inwardly projecting horizontal flanges movable between the said side-frames and have bearings for said axle and shaft, a single journaling device for said supporting-frame intersected by the medial line between said side frames on the side of the crank-shaft opposite said axle, bearings for said device, and a housing for said gearing comprising an upper and a lower and having lateral flanges projecting from their opposing edges between which the flanges of the supporting frame are secured.

6. A geared locomotive comprising side-frames, drive-wheels, the axle thereof, a crank-shaft, and gearing connecting the same to said axle, of an integral supporting-frame the parallel portions of which are movable vertically in said side-frames and have bearings for said axle and shaft, a single journaling device for said supporting-frame intersected by the medial line between said side frames on the side of the crank-shaft opposite said axle, bearings for said device, and a housing for said gearing comprising an upper and a lower and having their opposed edges cut away to accommodate the said flanges of the supporting-frame between them and provided with flanges that are secured to said last mentioned flanges.

7. A geared locomotive comprising side-frames, drive-wheels, the axle thereof, a crank-shaft, and gearing connecting the same to said axle, of an integral supporting-frame the parallel portions of which have inwardly projecting spaced apart horizontal flanges movable vertically in said side-frames and have bearings for said axle and shaft, a single substantially spherical journaling device for said supporting-frame intersected by the medial line between said side frames on the side of the crank-shaft opposite said axle, bearings for said device, and a housing for said gearing comprising an upper and a lower and having laterally projecting flanges that are secured to the flanges of said supporting-frame.

8. A geared locomotive comprising side-frames, drive-wheels, the axle thereof, a crank-shaft, and gearing connecting the same to said axle, of an integral supporting-frame the parallel portions of which are movable in said side-frames and have bearings, for said axle and shaft and connected by a transverse member at one end supported by a structure projecting from said cross member intersected by the medial line between said side-frames on the side of the crank-shaft opposite said axle, bearings for said device, and a housing for said gearing associated with said supporting-frame.

9. A geared locomotive comprising side-frames, drive-wheels, the axle thereof, a crank-shaft, and gearing connecting the same to said axle, of a supporting-frame the parallel portions of which are movable vertically in said side-frames and have bearings, for said axle and shaft and connected by a transverse member at one end supported by a structure projecting from said cross member intersected by the medial line between said side-frames on the side of the crank-shaft opposite said axle, bearings for said device, and a housing for said gearing comprising an upper and a lower and having their opposed edges cut away to accommodate the said flanges of the supporting-frame between them and provided with flanges that are secured to said last mentioned flanges.

In witness whereof, I have hereunto set my hand this 17th day of June, 1920.

Witnesses:
JOHN J. KASTLIN,
H. A. AIZBERGER.

ELMER F. BACKER.